United States Patent
Harris et al.

(10) Patent No.: US 10,662,792 B2
(45) Date of Patent: May 26, 2020

(54) GAS TURBINE ENGINE COOLING FLUID COMPOSITE TUBE

(71) Applicant: UNITED TECHNOLOGIES CORPORATION, Hartford, CT (US)

(72) Inventors: Meggan Harris, Colchester, CT (US); Alexander W. Williams, Windsor Locks, CT (US); Sheree R. Swenson-Dodge, Lebanon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 535 days.

(21) Appl. No.: 15/113,116

(22) PCT Filed: Jan. 29, 2015

(86) PCT No.: PCT/US2015/013472
§ 371 (c)(1),
(2) Date: Jul. 21, 2016

(87) PCT Pub. No.: WO2015/130425
PCT Pub. Date: Sep. 3, 2015

(65) Prior Publication Data
US 2016/0341054 A1 Nov. 24, 2016

Related U.S. Application Data

(60) Provisional application No. 61/935,109, filed on Feb. 3, 2014.

(51) Int. Cl.
*F01D 9/06* (2006.01)
*F01D 9/04* (2006.01)
(Continued)

(52) U.S. Cl.
CPC .............. *F01D 9/065* (2013.01); *F01D 9/041* (2013.01); *F01D 25/005* (2013.01); *F01D 25/12* (2013.01);
(Continued)

(58) Field of Classification Search
CPC ........ F01D 9/065; F01D 9/041; F01D 25/005; F01D 25/12; F01D 25/125;
(Continued)

(56) References Cited

U.S. PATENT DOCUMENTS 2,110,679 A * 3/1938 Robinson ................ F01D 5/141
  415/208.1
2,622,790 A * 12/1952 McLeod .................. F01D 9/042
  220/23.2
(Continued)

FOREIGN PATENT DOCUMENTS

EP 2584152 A2 * 4/2013 ........... F01D 25/162
EP 2584152 A2   4/2013
EP 3009601 A1 * 4/2016 ............. F01D 9/041

OTHER PUBLICATIONS

Wall Collar & Thrust Collar; US Pipe and Foundry Company (Year: 2013).*
(Continued)

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

A cooling arrangement for a turbine engine includes a cooling source and first and second structures. A ceramic-based composite cooling tube fluidly provides a fluid connection between the first and second structures. The cooling tube is configured to transfer a cooling fluid from the cooling source to the second structure.

10 Claims, 3 Drawing Sheets

(51) Int. Cl.
*F01D 25/00* (2006.01)
*F01D 25/12* (2006.01)

(52) U.S. Cl.
CPC ...... *F05D 2240/12* (2013.01); *F05D 2240/15* (2013.01); *F05D 2260/20* (2013.01); *F05D 2260/232* (2013.01); *F05D 2260/98* (2013.01); *F05D 2300/6033* (2013.01); *Y02T 50/672* (2013.01); *Y02T 50/676* (2013.01)

(58) Field of Classification Search
CPC ............. F05D 2240/12; F05D 2240/15; F05D 2260/20; F05D 2260/232; F05D 2260/98; F05D 2300/6033; Y02T 50/672; Y02T 50/676
USPC ....................................................... 415/115
See application file for complete search history.

(56) References Cited

U.S. PATENT DOCUMENTS

| | | | | |
|---|---|---|---|---|
| 3,075,744 | A * | 1/1963 | Peterson | F01D 5/182 415/115 |
| 3,909,157 | A * | 9/1975 | Wachtell | B23P 6/005 29/889.1 |
| 3,965,066 | A * | 6/1976 | Sterman | F01D 9/023 60/800 |
| 4,195,396 | A * | 4/1980 | Blazek | B23P 15/04 164/122.1 |
| 4,292,008 | A * | 9/1981 | Grosjean | F01D 5/186 415/115 |
| 4,314,794 | A * | 2/1982 | Holden | F01D 5/182 416/225 |
| 4,375,891 | A * | 3/1983 | Pask | F01D 11/025 277/384 |
| 4,376,004 | A * | 3/1983 | Bratton | F01D 5/184 156/89.27 |
| 4,464,094 | A * | 8/1984 | Gerken | B23P 15/006 164/122 |
| 4,642,024 | A * | 2/1987 | Weidner | F01D 11/08 415/116 |
| 4,821,522 | A * | 4/1989 | Matthews | F01D 9/023 415/175 |
| 4,987,944 | A * | 1/1991 | Parks | B22C 9/04 164/10 |
| 5,197,856 | A * | 3/1993 | Koertge | F01D 25/246 415/199.4 |
| 5,332,360 | A * | 7/1994 | Correia | F01D 9/042 29/889.21 |
| 5,398,496 | A * | 3/1995 | Taylor | F01D 9/023 60/752 |
| 5,470,198 | A * | 11/1995 | Harrogate | F01D 9/023 415/115 |
| 6,164,903 | A * | 12/2000 | Kouris | F01D 9/04 415/135 |
| 6,200,092 | B1 * | 3/2001 | Koschier | F01D 5/146 415/191 |
| 6,431,824 | B2 * | 8/2002 | Schotsch | F01D 9/02 415/115 |
| 6,763,654 | B2 * | 7/2004 | Orlando | F01D 1/24 415/69 |
| 6,854,738 | B2 * | 2/2005 | Matsuda | F01D 9/023 277/632 |
| 6,884,030 | B2 * | 4/2005 | Darkins, Jr. | F01D 9/042 29/889.22 |
| 6,988,369 | B2 * | 1/2006 | Conete | F23R 3/007 60/796 |
| 7,004,720 | B2 * | 2/2006 | Synnott | F01D 9/041 415/115 |
| 7,114,339 | B2 * | 10/2006 | Alvanos | F01D 5/081 60/806 |
| 7,114,917 | B2 * | 10/2006 | Legg | F01D 9/04 415/137 |
| 7,360,988 | B2 * | 4/2008 | Lee | F01D 9/00 29/889.22 |
| 7,452,182 | B2 * | 11/2008 | Vance | F01D 5/14 415/135 |
| 7,452,184 | B2 * | 11/2008 | Durocher | F01D 5/081 415/115 |
| 7,527,469 | B2 * | 5/2009 | Zborovsky | F01D 9/041 277/412 |
| 7,553,126 | B2 * | 6/2009 | Charier | F01D 17/14 415/128 |
| 7,713,029 | B1 | 5/2010 | Davies | |
| 7,726,131 | B2 * | 6/2010 | Sze | F23R 3/002 60/754 |
| 7,836,702 | B2 * | 11/2010 | Grivas | F01D 9/023 415/139 |
| 7,976,274 | B2 * | 7/2011 | Lee | F01D 5/143 415/190 |
| 8,388,307 | B2 * | 3/2013 | Smoke | F01D 9/042 415/135 |
| 8,783,044 | B2 * | 7/2014 | Steiger | F01D 5/186 415/115 |
| 8,950,192 | B2 * | 2/2015 | Tschuor | F02C 7/28 60/800 |
| 9,062,566 | B2 * | 6/2015 | Suciu | F01D 25/12 |
| 9,115,593 | B2 * | 8/2015 | Suciu | F02C 7/047 |
| 9,127,566 | B2 * | 9/2015 | Suciu | F02C 7/047 |
| 9,200,536 | B2 * | 12/2015 | McCaffrey | F01D 25/162 |
| 9,752,447 | B2 * | 9/2017 | Clum | F01D 9/023 |
| 9,828,914 | B2 * | 11/2017 | Suciu | F02C 7/06 |
| 10,060,291 | B2 * | 8/2018 | Kumar | F01D 25/162 |
| 10,087,847 | B2 * | 10/2018 | Szymanski | F01D 9/065 |
| 2005/0056020 | A1 * | 3/2005 | Hadder | F23R 3/005 60/752 |
| 2005/0254942 | A1 * | 11/2005 | Morrison | F01D 5/282 415/200 |
| 2007/0039330 | A1 * | 2/2007 | Bladon | F01D 3/04 60/785 |
| 2007/0140845 | A1 * | 6/2007 | Marke | F01D 9/06 415/232 |
| 2008/0041064 | A1 | 2/2008 | Moore et al. | |
| 2008/0199661 | A1 * | 8/2008 | Keller | B32B 18/00 428/188 |
| 2010/0132374 | A1 * | 6/2010 | Manteiga | F01D 9/02 60/796 |
| 2011/0070095 | A1 | 3/2011 | Harron | |
| 2011/0252808 | A1 * | 10/2011 | McKenney | F01D 25/164 60/796 |
| 2013/0064681 | A1 | 3/2013 | Lee | |
| 2013/0259639 | A1 * | 10/2013 | Suciu | F02C 7/047 415/1 |
| 2015/0219015 | A1 * | 8/2015 | Szymanski | F01D 9/065 60/796 |
| 2016/0097473 | A1 * | 4/2016 | Lang | E21B 17/02 285/45 |
| 2016/0108748 | A1 | 4/2016 | Harris | |
| 2016/0201688 | A1 | 7/2016 | Lyons et al. | |
| 2016/0230576 | A1 * | 8/2016 | Freeman | F01D 9/041 |
| 2016/0281721 | A1 * | 9/2016 | Army, Jr. | F04D 17/16 |
| 2016/0290147 | A1 * | 10/2016 | Weaver | F02C 3/04 |
| 2016/0298540 | A1 * | 10/2016 | Suciu | F02C 7/04 |
| 2016/0298544 | A1 * | 10/2016 | Suciu | F02C 7/06 |
| 2019/0337472 | A1 * | 11/2019 | Nakai | H01B 7/06 |

OTHER PUBLICATIONS

Supplementary European Search Report for European Application No. 15755240.7 dated Aug. 3, 2017.
International Search Report and Written Opinion for PCT Application No. PCT/US2015/013472, dated Sep. 8, 2015.
International Preliminary Report on the Patentability for PCT Application No. PCT/US2015/013472 dated Aug. 18, 2016.

* cited by examiner

GAS TURBINE ENGINE COOLING FLUID COMPOSITE TUBE

CROSS-REFERENCE TO RELATED APPLICATIONS

This application claims priority to U.S. Provisional Application No. 61/935,109, which was filed on Feb. 3, 2014 and is incorporated herein by reference.

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

BACKGROUND

This disclosure relates to a ceramic-based composite tube for transferring a cooling fluid within a hot environment of a gas turbine engine.

One type of gas turbine engine includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In one example hot gas turbine engine environment, exit vanes are provided at the end of the compressor section before the combustor section. Turbine vanes are provided at the end of the combustor section and provide the first fixed stage of the turbine section. This area of the engine experiences some of the hottest temperatures within the engine. Cooling fluid is provided to this area to reduce component temperatures and increase durability of the engine. Cooling fluid is typically provided to various locations throughout the engine using nickel alloy tubing, such as INCONEL 718.

SUMMARY

In one exemplary embodiment, a cooling arrangement for a turbine engine includes a cooling source and first and second structures. A ceramic-based composite cooling tube fluidly provides a fluid connection between the first and second structures. The cooling tube is configured to transfer a cooling fluid from the cooling source to the second structure.

In a further embodiment of the above, the first structure is an outer case structure. The second structure is an inner case structure.

In a further embodiment of any of the above, the cooling tube is arranged in a compressor section.

In a further embodiment of any of the above, an exit vane interconnects the inner and outer case structures. The cooling tube is disposed within the exit vane.

In a further embodiment of any of the above, the inner and outer case structures provide a gas flow path. The cooling tube is in the gas flow path.

In a further embodiment of any of the above, the cooling tube is arranged in a turbine section.

In a further embodiment of any of the above, the cooling source is compressor bleed air.

In a further embodiment of any of the above, the second case structure is a bearing compartment. The cooling tube is configured to provide a lubricant to the bearing compartment.

In a further embodiment of any of the above, the cooling source includes the lubricant.

In a further embodiment of any of the above, the cooling tube is a ceramic matrix composite or an organic matrix composite.

In a further embodiment of any of the above, the cooling tube is a non-metallic structure free from insulation.

In a further embodiment of any of the above, the cooling tube has opposing ends. A retaining feature is arranged at one of the ends.

In a further embodiment of any of the above, the retaining feature is a collar that has an outer dimension that is greater than an intermediate portion of the cooling tube provided between the ends.

In a further embodiment of any of the above, a retainer cooperates with the collar to secure the cooling tube to one of the first and second structures.

In a further embodiment of any of the above, the cooling tube has a circular cross-section.

In a further embodiment of any of the above, the cooling tube has a non-circular cross-section.

In another exemplary embodiment, a cooling tube for a gas turbine engine includes a ceramic-based composite cooling tube that has opposing ends. A retaining feature is arranged at one of the ends. The cooling tube is configured to transfer a cooling fluid from one end to another end.

In a further embodiment of the above, the cooling tube is a ceramic matrix composite or an organic matrix composite. The cooling tube is a non-metallic structure free from insulation.

In a further embodiment of any of the above, the retaining feature is a collar that has an outer dimension that is greater than an intermediate portion of the cooling tube provided between the ends.

In a further embodiment of any of the above, the cooling tube includes one of a circular cross-section and a non-circular cross-section.

In a further embodiment of any of the above, the cooling tube acts as a heatshield for one or more internal or external metallic tubes.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
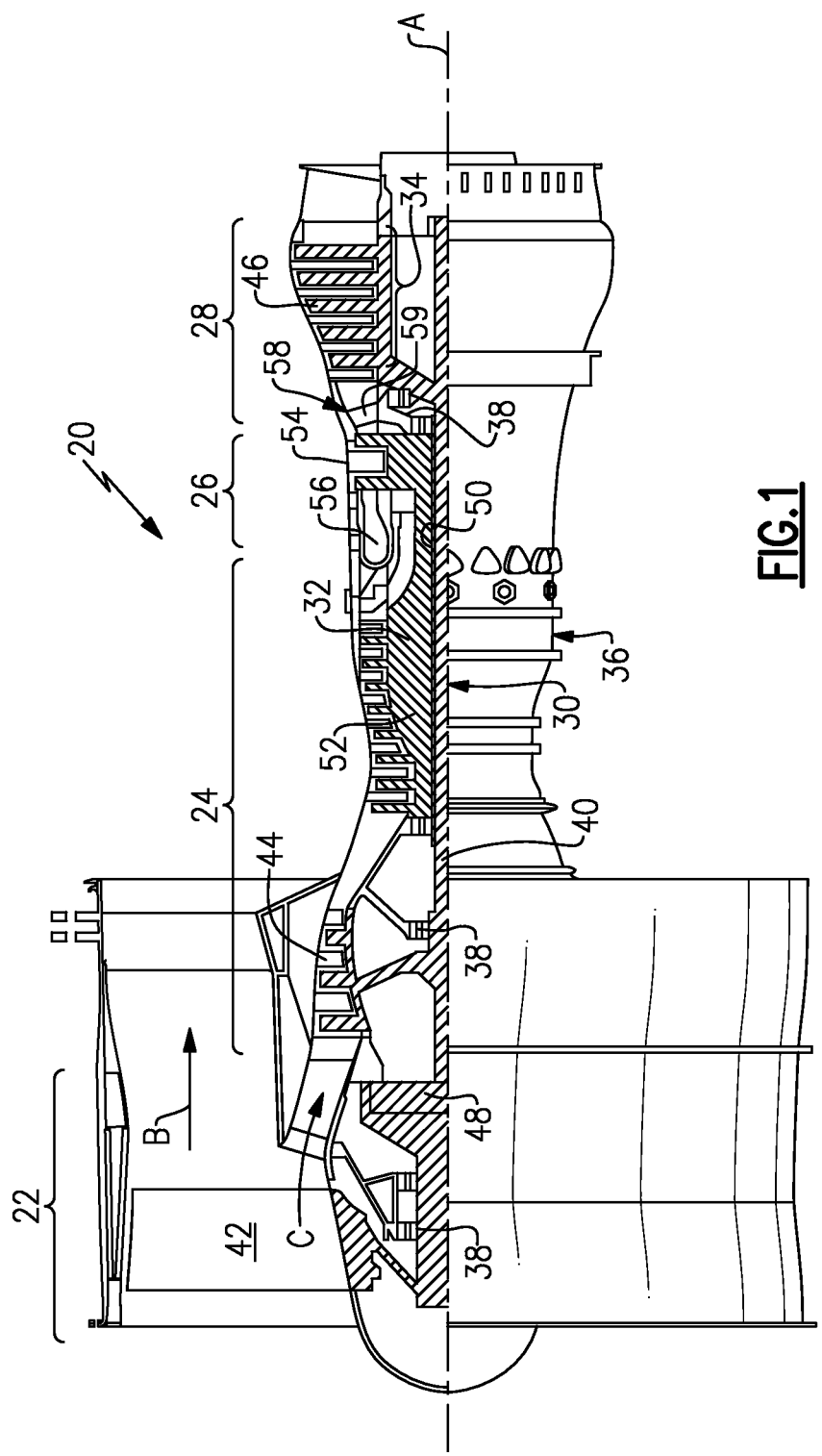
FIG. 1 is a schematic view of an example gas turbine engine including a combustor.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The commercial-style gas turbine engine shown in FIG. 1 is exemplary only. The disclosed cooling fluid composite tube may be used for any type of engine, including military and industrial gas turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
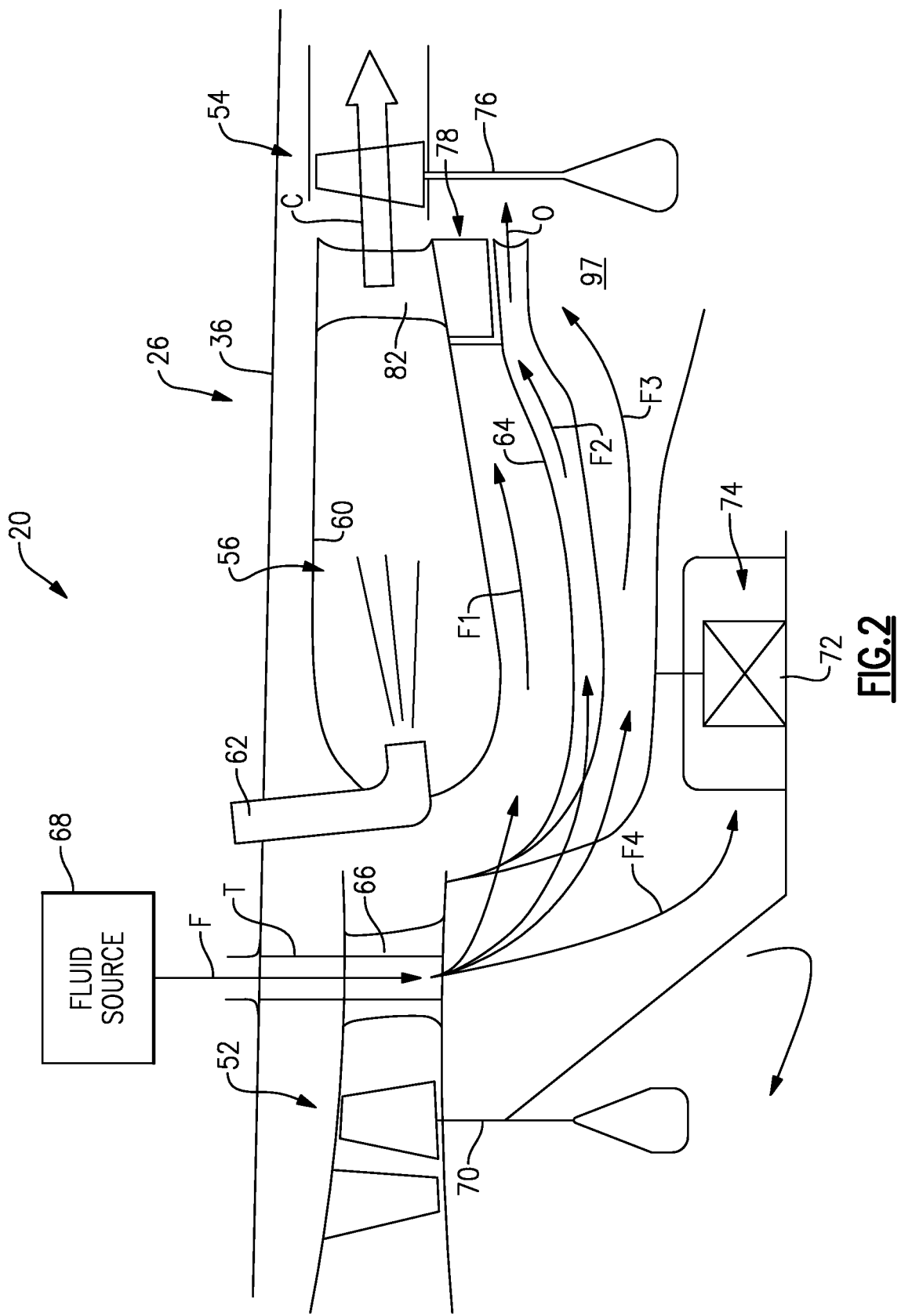
FIG. 2 is an enlarged schematic view of a gas turbine engine in the area of the combustor.

One example hot engine environment is shown in FIG. 2. The disclosed cooling tube T may be used in this or any other environment where a cooling fluid is in need of thermal insulation from the hot environment. An area of the combustor section 26 is shown in more detail in FIG. 2. The combustor section 26 includes a combustor 56 having a combustor housing 60. An injector 62 is arranged at a forward end of the combustor housing 60 and is configured to provide fuel to the combustor housing 60 where it is ignited to produce hot gases that expand through the turbine section 54.

A diffuser case 64 is secured to the combustor housing 60 and fixed relative to the engine static structure 36. Exit vanes 66 are arranged downstream from the compressor section 52 and upstream from the combustor section 26. A fluid source 68, such as bleed air from a compressor stage, provides cooling fluid F through a ceramic-based cooling tube T that extends through the exit vanes 66 to various locations within the gas turbine engine 20. Other fluids may be provided, such as diffuser air or cooled air, for example. A circumferential array of exit vanes 66 are used, which include a corresponding circumferential array of cooling tubes.

The compressor section 52 includes a compressor rotor 70 supported for rotation relative to the engine static structure

36. The turbine section 54 includes a turbine rotor 76 arranged downstream from a tangential onboard injector (TOBI) module 78. The TOBI module 78 supports a circumferential array of vanes 82 that are arranged upstream from the turbine rotor 76. The vanes 82 provide the first fixed stator stage of the turbine section 54.

The fluid F is distributed to various locations within the gas turbine engine 20 for a variety of uses. Because the cooling tube T is provided in a hot environment with extreme temperatures, the cooling fluid F within the cooling tube T may become heated from the surrounding environment to where the effectiveness of the cooling fluid F is significantly diminished. To this end, it is desirable to provide a ceramic-based composite cooling tube T that is light weight, rather than, for example, a heavier metallic tube with insulation. However, the ceramic-based composite may be used as a heat shield for one or more metallic tubes that are arranged internally or externally with respect to the composite. The tube may also include sealing features.

Figure 3:
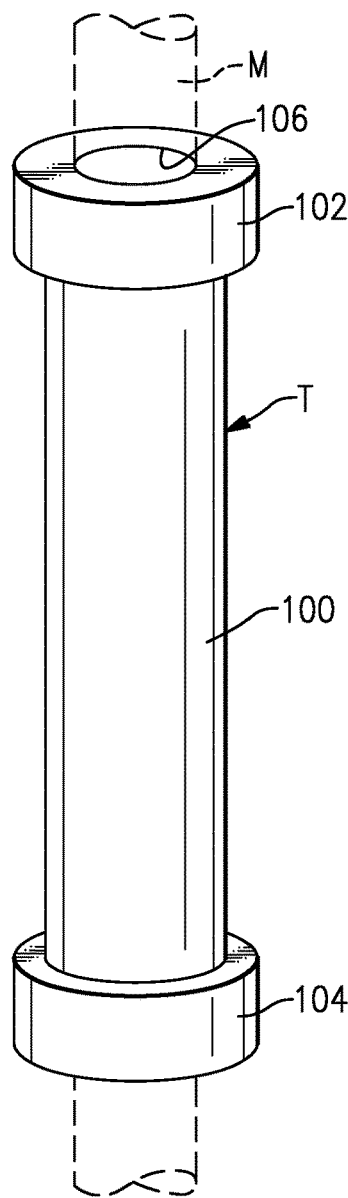
FIG. 3 is a schematic view of a ceramic-based composite cooling tube.
Figure 4:
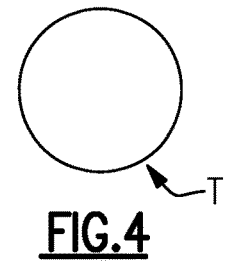
FIG. 4 is a first example cross-section of the cooling tube.
Figure 5:
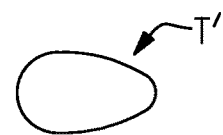
FIG. 5 is a second example cross-section of the cooling tube.

An example cooling tube T is shown in FIGS. 3 and 4. The cooling tube T may be, for example, a ceramic-based composite such as organic matrix composite (OMC) or ceramic matrix composite (CMC). Layers of the ceramic-based composite material can be layed up on a mandrel M to provide a desired length, shape and cross-section. The cross-section may be circular (FIG. 4) or non-circular (FIG. 5), for example, an elliptical shaped cooling tube T'.

Figure 6:
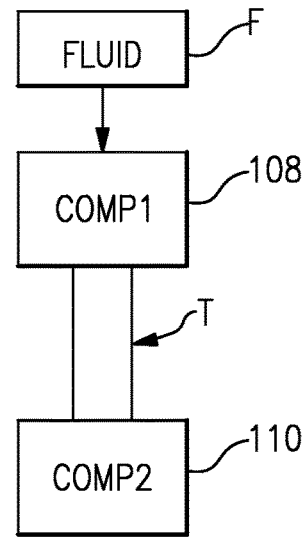
FIG. 6 is a schematic view of a hot engine environment that includes the cooling tube.

Referring to FIG. 6, a cooling arrangement for a gas turbine engine schematically illustrates a cooling fluid F from a cooling source. First and second structures 108, 110, which may be outer and inner case structures, for example, are spaced apart from one another. The cooling tube T is used provide a fluid connection between the first and second structures 108, 110, such that the cooling tube T transfers the cooling fluid F from the cooling source to the second structure 110.

The inner and outer case structures may be arranged in a turbine section or in a compressor section, such as that depicted in FIG. 2. In that example, the exit vanes 66 interconnect the inner and outer case structures, and the cooling tube T is disposed within the exit vane 66. The inner and outer case structures provide a gas flow path, and the cooling tube is arranged, indirectly, in the gas flow path, exposing the cooling fluid F to high heat as it travels through the exit vane 66. The ceramic-based composite material keeps the cooling fluid F at suitably low temperatures.

Returning to FIG. 6, the second case structure 110 may be a bearing compartment. The cooling source includes the lubricant, and the cooling tube T is configured to provide a lubricant to the bearing compartment.

Figure 7:
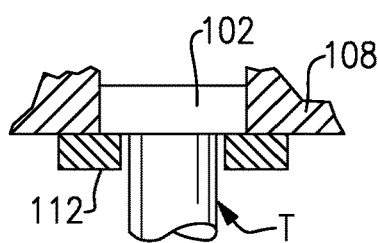
FIG. 7 is a schematic view of an example cooling tube retaining feature.

Referring to FIGS. 3 and 7, the cooling tube T has opposing ends. A retaining feature 102, 104, such as a collar, is arranged at at least one of the ends, and in the example, at both ends. The collar has an outer dimension that is greater than an intermediate portion 100 of the cooling tube T provided between the ends 102, 104. A retainer 112 cooperates with the collar to secure the cooling tube T to one of the first and second structures, for example, the first structure 108.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A turbine engine comprising:
a compressor section;
a combustor section;
a cooling arrangement comprising:
   a lubricant cooling source having a lubricant; first and second structures respectively corresponding to outer and inner case structures;
   a ceramic-based composite cooling tube fluidly providing a fluid connection between the first and second structures, the lubricant cooling tube configured to transfer a cooling fluid from the cooling source to the second structure; and
an exit vane interconnecting the inner and outer case structures, the exit vane arranged downstream from the compressor section and upstream from the combustor section, and the cooling tube is disposed within the exit vane, wherein the second case structure is a bearing compartment, and the cooling tube is configured to provide the lubricant to the bearing compartment; and
wherein the cooling tube acts as a heatshield for at least one metallic tube, the at least one metallic tube is arranged internally or externally relative to the cooling tube.

2. The turbine engine according to claim 1, wherein the lubricant cooling source is compressor bleed air.

3. The turbine engine according to claim 1, wherein the lubricant cooling source includes the lubricant.

4. The turbine engine according to claim 1, wherein the cooling tube is a ceramic matrix composite or an organic matrix composite.

5. The turbine engine according to claim 4, wherein the cooling tube is a non-metallic structure free from insulation.

6. The turbine engine according to claim 1, wherein the cooling tube has a circular cross-section.

7. The turbine engine according to claim 1, wherein the cooling tube has a non-circular cross-section.

8. A turbine engine comprising:
a compressor section;
a combustor section;
a cooling arrangement comprising:
   a cooling source;
   first and second structures respectively corresponding to outer and inner case structures;
   a ceramic-based composite cooling tube fluidly providing a fluid connection between the first and second structures, the cooling tube configured to transfer a cooling fluid from the cooling source to the second structure; and
an exit vane interconnecting the inner and outer case structures, the exit vane arranged downstream from the compressor section and upstream from the combustor section, and the cooling tube is disposed within the exit vane, wherein the cooling tube has opposing ends, and a collar is arranged at at least one of the ends and cooperates with a retainer on one of the first and second structures to secure the cooling tube to one of the first and second structures, the cooling tube configured to transfer a cooling fluid from one end to another end; and wherein the cooling tube acts as a heatshield for at least one metallic tube, the at least one metallic tube is arranged internally or externally relative to the cooling tube.

9. The turbine engine according to claim 8, wherein the collar has an outer dimension that is greater than an intermediate portion of the cooling tube provided between the ends.

10. A turbine engine comprising:
a compressor section;
a combustor section;
a cooling arrangement comprising:
  a cooling source;
  first and second structures respectively corresponding to outer and inner case structures;
  a ceramic-based composite cooling tube fluidly providing a fluid connection between the first and second structures, the cooling tube configured to transfer a cooling fluid from the cooling source to the second structure; and
an exit vane interconnecting the inner and outer case structures, the exit vane arranged downstream from the compressor section and upstream from the combustor section, and the cooling tube is disposed within the exit vane, at least one metallic tube, wherein the cooling tube acts as a heatshield for the at least one metallic tube, the at least one metallic tube is arranged internally or externally relative to the cooling tubes.

* * * * *